US 9,371,803 B2

(12) United States Patent
Pifer et al.

(10) Patent No.: US 9,371,803 B2
(45) Date of Patent: Jun. 21, 2016

(54) VALVE ASSEMBLY

(71) Applicant: Eaton Corporation, Cleveland, OH (US)

(72) Inventors: Daniel Lee Pifer, Chelsea, MI (US); Vaughn Mills, Chelsea, MI (US); Ronald Sexton, South Lyon, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/575,352

(22) Filed: Dec. 18, 2014

(65) Prior Publication Data

US 2015/0096633 A1    Apr. 9, 2015

Related U.S. Application Data

(63) Continuation-in-part of application No. 14/043,157, filed on Oct. 1, 2013, now Pat. No. 8,944,101, which is a continuation of application No. 13/011,676, filed on Jan. 21, 2011, now Pat. No. 8,573,255, which is a
(Continued)

(51) Int. Cl.
*F16K 17/164* (2006.01)
*F16K 21/04* (2006.01)
(Continued)

(52) U.S. Cl.
CPC ...... *F02M 25/0836* (2013.01); *B60K 15/03519* (2013.01); *F16K 15/18* (2013.01);
(Continued)

(58) Field of Classification Search
CPC .......... F02M 25/0836; F02M 25/0772; F02M 25/0789; B60K 15/03519; F16K 17/164; F16K 31/0624; F16K 31/0655; F16K 24/04; Y10T 137/86332; Y10T 137/87338; Y10T 137/87507; Y10T 137/7779; Y10T 137/87555
See application file for complete search history.

(56) References Cited

U.S. PATENT DOCUMENTS 4,192,346 A * 3/1980 Iizumi ............... F15B 13/01
                                                           137/509
4,227,674 A    10/1980 Grant, Jr.
(Continued)

FOREIGN PATENT DOCUMENTS

EP    0713036 A1    5/1996
EP    2071217 A1    6/2009
(Continued)

OTHER PUBLICATIONS

Yojiro Iriyama, Masahide Kobayashi, Takuji Matsubara, Yuusaku Nishimura, Ryosuke Nomura, and Takashi Ishikawa, "Design of a Fuel Vapor-containment System (FVS) to Meet Zero Evaporative Emissions Requirements in a Hybrid Electric Vehicle", SAE international, 2005-01-3825, 2005, pp. 1-8.
(Continued)

*Primary Examiner* — Atif Chaudry
(74) *Attorney, Agent, or Firm* — Mei & Mark LLP

(57) ABSTRACT

An angle flow valve comprises a housing and a cover. The housing comprises a first recess for receiving a flow restrictor, a second recess for receiving a relief valve, a first port fluidly connected to the first recess, an angled flow path fluidly connected to the first recess and to the second recess, a second port fluidly connected to the angled flow path, and a relief passage between the first recess and the second recess. The first recess is parallel to the second recess, permitting drop-in assembly of the flow restrictor and relief valve. The cover comprises a solenoid assembly, and the cover couples to the housing by adjoining the solenoid against the flow restrictor and by adjoining the cover against the relief valve. A single o-ring seals the leak path between the cover and the housing.

18 Claims, 6 Drawing Sheets

Related U.S. Application Data continuation-in-part of application No. 12/749,924, filed on Mar. 30, 2010, now Pat. No. 8,584,704.

(60) Provisional application No. 61/171,548, filed on Apr. 22, 2009.

(51) Int. Cl.
  *F16K 31/06* (2006.01)
  *B60K 15/035* (2006.01)
  *F02M 25/07* (2006.01)
  *F02M 25/08* (2006.01)
  *F16K 15/18* (2006.01)
  *F16K 24/04* (2006.01)
  *F16K 17/04* (2006.01)
  *B60K 15/03* (2006.01)

(52) U.S. Cl.
  CPC ........... *F16K17/0413* (2013.01); *F16K 17/164* (2013.01); *F16K 24/04* (2013.01); *F16K 31/0624* (2013.01); *F16K 31/0655* (2013.01); *B60K 2015/03302* (2013.01); *B60K 2015/03514* (2013.01); *F02M 2025/0845* (2013.01); *Y10T 137/87338* (2015.04)

(56) References Cited

U.S. PATENT DOCUMENTS

| | | |
|---|---|---|
| 4,231,542 A | 11/1980 | Grenier |
| 4,364,305 A | 12/1982 | Dalibout et al. |
| 4,370,983 A | 2/1983 | Lichtenstein |
| 4,685,156 A | 8/1987 | Brabazon |
| 4,865,078 A | 9/1989 | Ensign |
| 4,964,677 A * | 10/1990 | Splinter ............... B60R 25/08 188/265 |
| D314,229 S | 1/1991 | Nestich |
| 5,048,790 A | 9/1991 | Wells |
| 5,083,546 A | 1/1992 | Detweiler et al. |
| 5,211,151 A | 5/1993 | Nakajima et al. |
| 5,218,995 A | 6/1993 | Lee |
| 5,406,975 A | 4/1995 | Nakamichi et al. |
| 5,605,177 A | 2/1997 | Ohashi et al. |
| 5,967,183 A | 10/1999 | Detweiler et al. |
| 5,996,603 A | 12/1999 | Dupler |
| 6,526,951 B2 | 3/2003 | Ishigaki et al. |
| D502,762 S | 3/2005 | Kriegshauser |
| 6,910,745 B2 * | 6/2005 | Inage ..................... B60T 8/341 137/539.5 |
| 7,152,587 B2 | 12/2006 | Suzuki |
| 7,267,113 B2 | 9/2007 | Tsuge et al. |
| 7,270,310 B2 | 9/2007 | Takakura |
| 7,347,192 B2 | 3/2008 | Perry et al. |
| 7,422,193 B2 | 9/2008 | Sisk et al. |
| 7,448,367 B1 | 11/2008 | Reddy et al. |
| D585,959 S | 2/2009 | Caron et al. |
| 7,591,281 B2 | 9/2009 | Tsuge |
| D621,003 S | 8/2010 | Gramegna et al. |
| 7,828,265 B2 | 11/2010 | Sisk et al. |
| D686,699 S | 7/2013 | Evans et al. |
| 8,573,255 B2 | 11/2013 | Pifer et al. |
| 8,584,704 B2 | 11/2013 | Pifer et al. |
| D706,389 S | 6/2014 | McLauchlan et al. |
| D706,390 S | 6/2014 | McLauchlan et al. |
| 8,944,100 B2 | 2/2015 | Pifer et al. |
| D728,746 S | 5/2015 | McLauchlan et al. |
| D728,747 S | 5/2015 | McLauchlan et al. |
| D747,784 S | 1/2016 | McLauchlan et al. |
| D750,746 S | 3/2016 | McLauchlan et al. |
| 2001/0017160 A1 | 8/2001 | Ishigaki et al. |
| 2005/0181647 A1 | 8/2005 | Dehnen et al. |
| 2005/0217734 A1 | 10/2005 | Takakura |
| 2006/0207663 A1 | 9/2006 | Tsuge |
| 2008/0042086 A1 | 2/2008 | Sisk et al. |
| 2010/0269921 A1 | 10/2010 | Pifer et al. |
| 2011/0240145 A1 | 10/2011 | Pifer |

FOREIGN PATENT DOCUMENTS

| | | |
|---|---|---|
| JP | S593071 U | 1/1984 |
| JP | H01173579 U | 12/1989 |
| JP | H04105959 U | 9/1992 |
| JP | H0669544 U | 9/1994 |
| JP | H0771335 A | 3/1995 |
| JP | 2001099015 A | 4/2001 |
| JP | 2006258135 A | 9/2006 |
| JP | 2008513651 A | 5/2008 |
| WO | 0190611 A2 | 11/2001 |
| WO | 2006029537 | 3/2006 |

OTHER PUBLICATIONS

International Search Report and Written Opinion dated Jul. 6, 2012 for PCT application No. PCT/US2012/021876 filed Jan. 19, 2012, pp. 1-12.

International Search Report and Written Opinion issued in Application No. PCT/IB2012/000079. Date of Mailing: Jul. 26, 2012, pp. 1-13.

U.S. Appl. No. 29/554,814, filed Feb. 16, 2016, to McLauchlan et al., application body as-filed, pp. 1-59.

* cited by examiner

VALVE ASSEMBLY

CROSS-REFERENCE TO RELATED APPLICATIONS

This application is a Continuation in Part of U.S. Utility application Ser. No. 14/043,157, filed Oct. 1, 2013, which is a Continuation of U.S. Utility application Ser. No. 13/011,676, filed Jan. 21, 2011, which is a Continuation In Part of U.S. Utility application Ser. No. 12/749,924, filed Mar. 30, 2010, which claims the benefit of U.S. Provisional Application Ser. No. 61/171,548, filed Apr. 22, 2009, the disclosures of which are hereby incorporated by reference in their entirety. U.S. Design application Ser. No. 29/404,911, filed Oct. 26, 2011 is also incorporated herein by reference in its entirety.

TECHNICAL FIELD

The present invention relates to a valve assembly for controlling fluid flow. An angle flow valve comprises a housing and cover facilitating drop-in assembly for emissions control and both over pressure and vacuum relief.

BACKGROUND

Valves are employed in a multitude of industries to control flow of liquids and/or gases. One application for such control valves appears in vehicles with stored fuel to control a vehicle's evaporative emissions resulting from gasoline vapors escaping from the vehicle's fuel system. Evaporative emissions of modern vehicles are strictly regulated in many countries. To prevent fuel vapors from venting directly to the atmosphere, a majority of vehicles manufactured since the 1970's include specifically designed evaporative emissions systems. Additionally, in recent years vehicle manufacturers began developing fully sealed fuel delivery to their engines.

In a typical evaporative emissions system, vented vapors from the fuel system are sent to a purge canister containing activated charcoal. The activated charcoal used in such canisters is a form of carbon that has been processed to make it extremely porous, creating a very large surface area available for adsorption of fuel vapors and/or chemical reactions. During certain engine operational modes, with the help of specifically designed control valves, the fuel vapors are adsorbed within the canister. Subsequently, during other engine operational modes, and with the help of additional control valves, fresh air is drawn through the canister, pulling the fuel vapor into the engine where it is burned.

SUMMARY

An angle flow valve comprises a housing. The housing comprises a first recess for receiving a flow restrictor, a second recess for receiving a relief valve, a first port fluidly connected to the first recess, an angled flow path fluidly connected to the first recess and to the second recess, a second port fluidly connected to the angled flow path, and a relief passage between the first recess and the second recess. The first recess is parallel to the second recess, permitting drop-in assembly of the flow restrictor and relief valve.

The angle flow valve further comprises a cover. The cover comprises a solenoid assembly. The cover couples to the housing by adjoining the solenoid against the flow restrictor and by adjoining the cover against the relief valve. A single o-ring seals the leak path between the cover and the housing.

The above features and advantages and other features and advantages of the present invention are readily apparent from the following detailed description of the best modes for carrying out the invention when taken in connection with the accompanying drawings.

DETAILED DESCRIPTION

Figure 1:
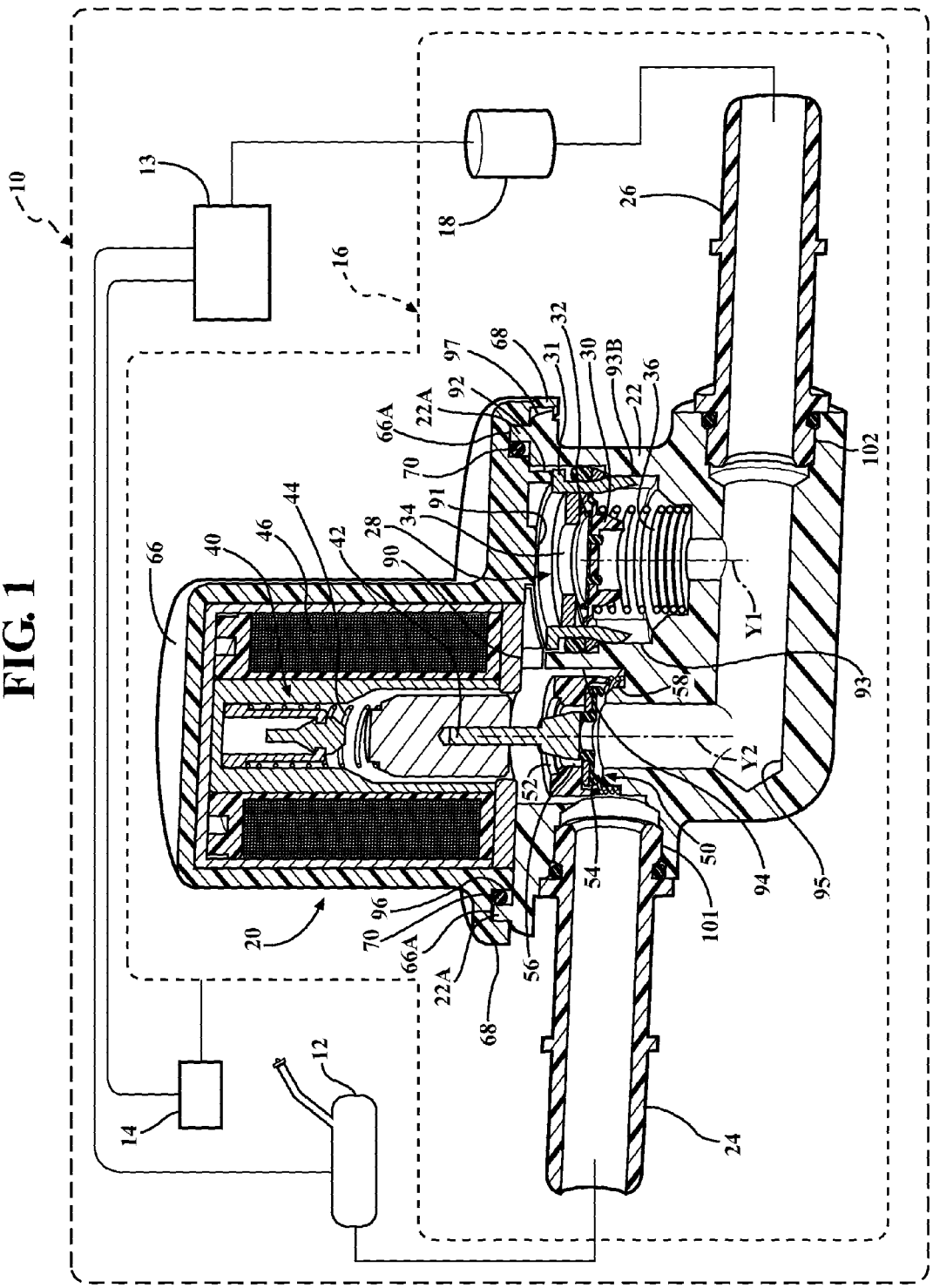
FIG. 1 is a schematic cross-sectional view of a valve assembly configured for controlling fuel vapor flow between a fuel tank and a purge canister, with the valve shown in a closed state, according to one embodiment of the invention.

Referring to the drawings wherein like reference numbers correspond to like or similar components throughout the several figures, FIG. 1 illustrates a vehicle, schematically represented by numeral 10. Vehicle 10 includes a fuel tank 12 configured as a reservoir for holding fuel to be supplied to an internal combustion engine 13 via a fuel delivery system which typically includes a fuel pump (not shown), as understood by those skilled in the art. Vehicle 10 may also include a controller 14 that is configured to regulate the operation of engine 13 and its fuel delivery system. Fuel tank 12 is operatively connected to an evaporative emissions control system 16 that includes a purge canister 18 adapted to collect fuel vapor emitted by the fuel tank 12 and to subsequently release the fuel vapor to engine 13. Controller 14 is also configured to regulate the operation of evaporative emissions control system 16 in order to recapture and recycle the emitted fuel vapor. In addition, controller 14 is adapted to regulate the operation of valve assembly 20, i.e., to selectively open and close the valve, in order to provide over-pressure and vacuum relief for the fuel tank 12.

Evaporative emissions control system 16 includes a valve assembly 20. Valve assembly 20 is configured to control a flow of fuel vapor between the fuel tank 12 and the purge canister 18. Although valve assembly 20 as shown is located between fuel tank 12 and purge canister 18, nothing precludes locating the valve assembly in a different position, such as between the purge canister 18 and the engine 13.

Valve assembly 20 includes a housing 22, which retains all internal components of the valve assembly in a compact manner. Housing 22 connects to fuel tank 12 via a connector 24 in a port 101, and to the purge canister via a connector 26 in port 102. O-rings 103 & 105 and glands 107 & 109 can be used to seal the connectors 24 & 26 to the ports 101 & 102. Housing 22 is tooled to accommodate a relief valve 28 and a flow restrictor 50 via a drop-in assembly method and is tooled to provide flow paths between the fuel tank 12 and purge canister 18.

A first recess 94 includes fluid connection to the first port 101 via first path 220 and fluid connection to an angled flow path 95 via second path 222. First path 220 is perpendicular to second path 222. The first recess is cylindrical about a central axis Y2, and the flow restrictor actuates along the central axis Y2. First recess 94 is parallel to second path 222. First recess 94 is stepped to receive spring 58 and is angled along an edge 941 to cooperate with a seal 54 of the flow restrictor 50.

The angled flow path 95 comprises another 90 Degree change in the direction of the flow path between the fuel tank 12 and the purge canister 18. The second path 222 is perpendicular to a third path 224. Second path 222 and third path 224 cooperate in forming the angled flow path 95. A fourth flow path 226 fluidly connects to the third flow path 224, is parallel to the third flow path 224, and fluidly connects to the second port 102.

The relief valve 28 fluidly couples to the angled flow path 95 by intersecting a fifth flow path 228 perpendicular to the third flow path 224. A second recess 93 is cylindrical about a central axis Y1 and actuates along the central axis Y1. The fifth flow path 228 is parallel to the second recess 93. The second recess 93 is stepped to receive and align components of the relief valve 28. For example, a first step 93A provides a wall to seal against an o-ring 33 of the relief valve. A second step 93B provides alignment for a cartridge 31 of the relief valve 28 and can provide a press-fit surface for firmly receiving the cartridge 31. A third step 93C provides alignment for a spring 36 of the relief valve.

Because central axis Y1 is parallel to central axis Y2, and because the first recess 94 communicates with the angled flow path 95 on the same side as the communication of the second recess 93 with the angled flow path 95, the housing 22 provides a convenient assembly design. The relief valve 28 is dropped into the housing 22 on the same side as the flow restrictor 50. That is, the third path 224 is embedded in the housing beneath the relief valve 28 and the flow restrictor 50 so that the housing 22 receives the relief valve 28 and flow restrictor 50 via a drop-in assembly method.

A relief passage 90 permits fluid communication between the relief valve 28 and the flow restrictor 50, and the relief passage is formed on the same side that the relief valve and flow restrictor are dropped into the housing 22. The relief passage 90 can be formed by stepping down the material shared by first recess 94 and first step 93A. Because the relief passage is recessed in to the housing 22, the cover 66 does not require modification to provide a flow path, and the stop plate 78 in the cover 66 is easily accommodated. But, the stop plate 78 can include a step 781 to align and orient the spring 80 of the flow restrictor of FIG. 6. Likewise, the cover 66 can include steps 91 and 92 to align and restrict the travel of at least the relief valve. For example, step 92 can restrict the motion of cartridge 31 to prevent the cartridge 31 from blocking the relief passage 90. The relief passage 90 provides a flow path parallel to first path 220 and third path 224, but is perpendicular to second path 222.

Relief valve 28 includes a piston 30, which may be formed from a suitable chemically-resistant material such as an appropriate plastic or aluminum. Relief valve 28 may also include a compliant seal 32, which may be formed from a suitable chemically-resistant elastomeric material. Seal 32 may be an inward-sloped dynamic pressure seal, i.e., such that the seal's outer edge or lip is angled toward a central axis Y1. In operation, seal 32 makes initial contact with the housing 22 along the seal's angled outer edge. After the initial contact with housing 22, the outer edge of seal 32 deflects to conform to the housing and hermetically closes a passage 34. The inward slope of the seal's outer edge provides enhanced control of fuel vapor flow at small openings between seal 32 and housing 22.

Figure 2:
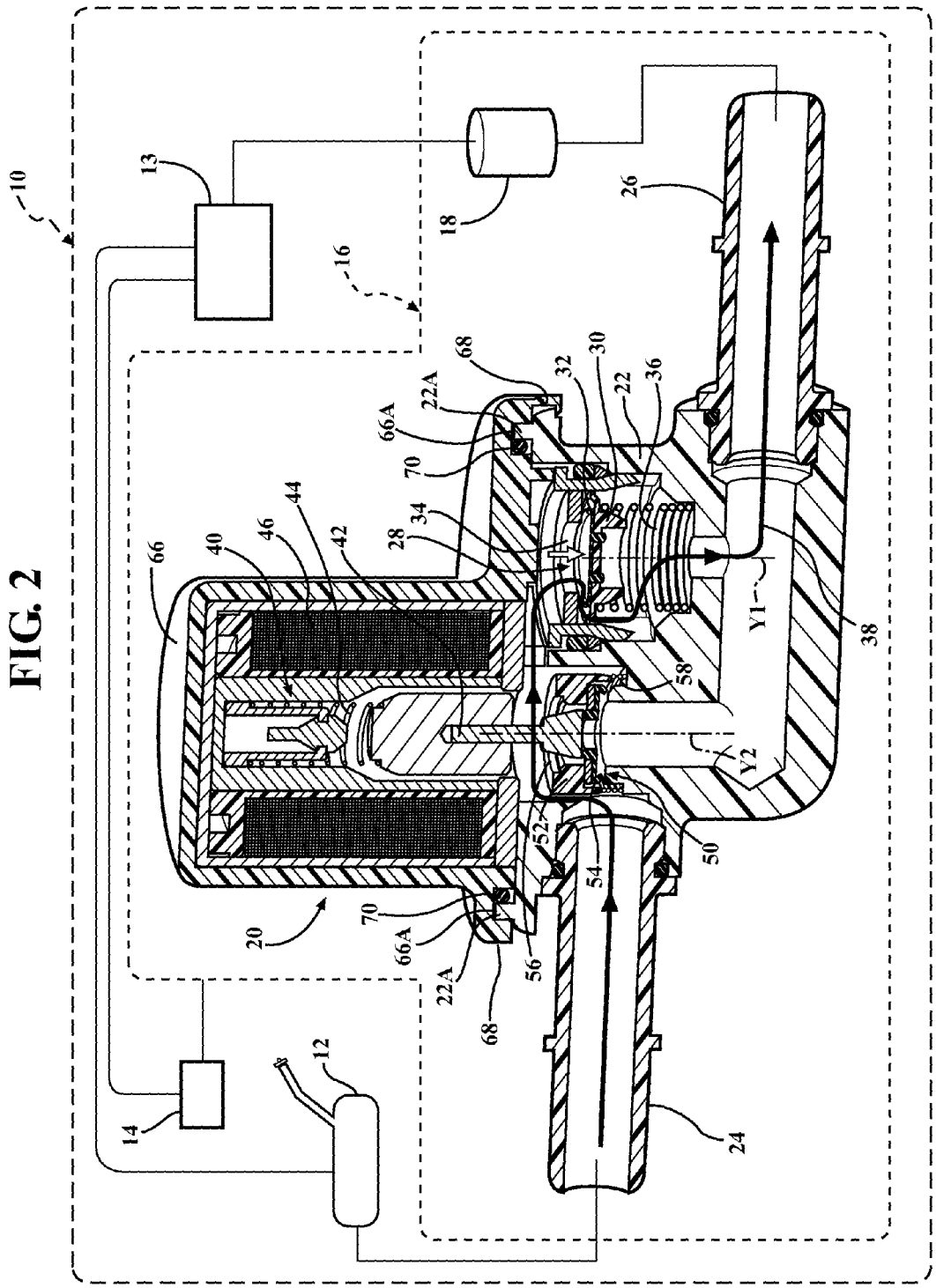
FIG. 2 is a schematic cross-sectional view of the valve assembly shown in FIG. 1, with a first flow path between the fuel tank and the purge canister shown in an open state.

Piston 30 and seal 32 may be combined into a unitary piston assembly via an appropriate manufacturing process such as overmolding, as understood by those skilled in the art. Piston 30 and seal 32 are urged to close passage 34 by a spring 36. As shown in FIG. 2, relief valve 28 is configured to facilitate opening a first fuel vapor flow path being traversed by the fuel vapor flowing in a direction from the fuel tank 12 toward the purge canister 18, represented by an arrow 38, when the fuel tank 12 is above a first predetermined pressure value. The first predetermined pressure value is preferably a positive number, representing an extreme or over-pressure condition of fuel tank 12.

The over-pressure condition of fuel tank 12 may depend on design parameters typically specified according to appropriate engineering standards and commonly includes a factor of safety to preclude operational failure of the fuel tank. Pressure in the fuel tank 12 may vary in response to a number of factors, such as the amount and temperature of the fuel contained therein. The first predetermined pressure value may be established based on the design parameters of the fuel tank 12 and of the engine's fuel delivery system, as well as based on empirical data acquired during testing and development.

Valve assembly 20 also includes a solenoid assembly 40 arranged inside housing 22, and adapted to receive electrical power from a vehicle alternator or from an energy-storage device (not shown), and be triggered or energized by a control signal from controller 14. Solenoid assembly 40 includes an armature 42, a solenoid spring 44, and a coil 46, as understood by those skilled in the art. Solenoid spring 44 is configured to generate a force sufficient to urge armature 42 out of the solenoid assembly 40, when the solenoid assembly is not energized. Coil 46 is configured to energize solenoid assembly 40, and to withdraw armature 42 into the solenoid assembly by overcoming the biasing force of spring 44.

Valve assembly 20 additionally may include a flow restrictor 50. Flow restrictor 50 is arranged inside the housing 22, and includes a piston 52 which may be formed from a suitable chemically-resistant material such as an appropriate plastic or aluminum. Flow restrictor 50 also includes a compliant seal 54, which may be formed from a suitable chemically-resistant rubber. Seal 54 is an inward-sloped dynamic pressure seal, i.e., such that the seal's outer edge or lip is angled toward a central axis Y2. In operation, seal 54 makes initial contact with the housing 22 along the seal's angled outer edge. After the initial contact with housing 22, the outer edge of seal 54 deflects to conform to the housing and to hermetically close a passage 56. The inward slope of the seal's outer edge provides enhanced control of fuel vapor flow at small openings between seal 54 and housing 22.

Similar to the piston 30 and seal 32 above, piston 52 and seal 54 may be combined into a unitary piston assembly via an appropriate manufacturing process such as overmolding. Piston 52 and seal 54 are urged to close passage 56 by the action of a spring 58. In the embodiment shown in FIG. 1, flow restrictor 50 is configured to be normally closed via the extension of armature 42 under the urging of solenoid spring 44 in the absence of the control signal from controller 14. Referring back to FIG. 2, the normally closed position of the flow restrictor, combined with the opening of relief valve 28 (as described above), also facilitates the opening of the first flow fuel vapor flow path represented by arrow 38.

Figure 3:
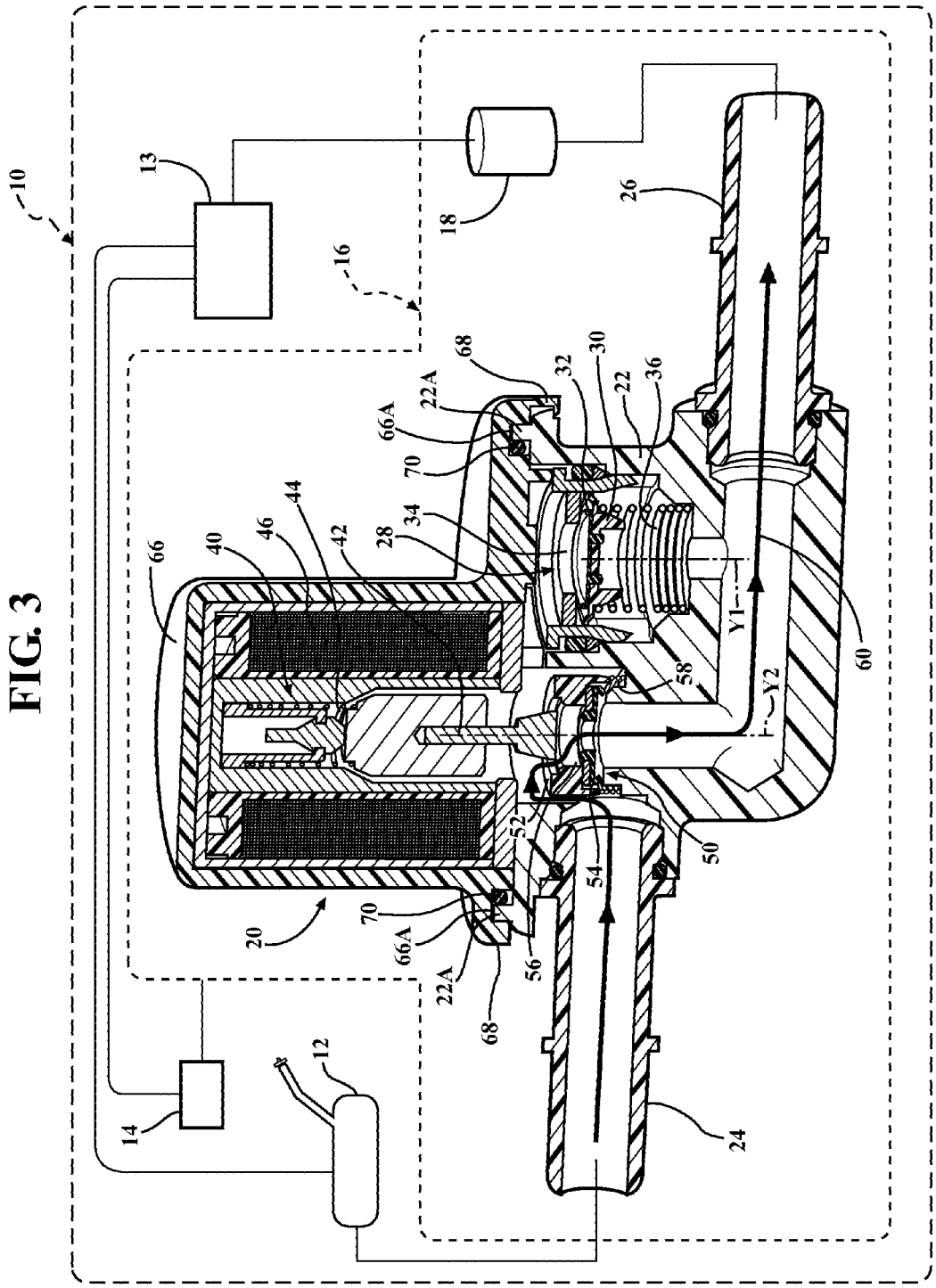
FIG. 3 is a schematic cross-sectional view of the valve assembly shown in FIG. 1, with a second flow path between the fuel tank and the purge canister shown in an open state.

As shown in FIG. 3, passage 56 is exposed when armature 42 is withdrawn into solenoid assembly 40 in response to the solenoid assembly being energized by the control signal from controller 14. Spring 58 is compressed by the force of the flow of fuel vapor, and the flow restrictor 50 is pushed out of the way by the vapor flow to thereby facilitate the opening of passage 56. Exposing passage 56 opens a second fuel vapor flow path to be traversed by the fuel vapor flowing in the direction from the fuel tank 12 toward the purge canister 18, represented by arrow 60. Fuel vapor flows in the direction represented by arrow 60 when a rate of fluid flow from fuel tank 12 to purge canister 18 is greater than a predetermined reference value in order to open passage 56.

The rate of fluid flow from fuel tank 12 may vary in response to a number of factors, such as the amount, temperature and pressure of the fuel contained therein. The predetermined reference value of the rate of fluid flow may be set at, for example, approximately 260 liters per minute (LPM), but may also be established in relation to a higher or a lower predetermined reference value. The reference value is typically predetermined or established in accordance with operating parameters of a particular engine's fuel delivery system, as understood by those skilled in the art. The predetermined rate of fluid flow, however, must be sufficiently high to compress spring 58 and thereby expose passage 56, and the rate of spring 58 should therefore be selected accordingly.

Figure 4:
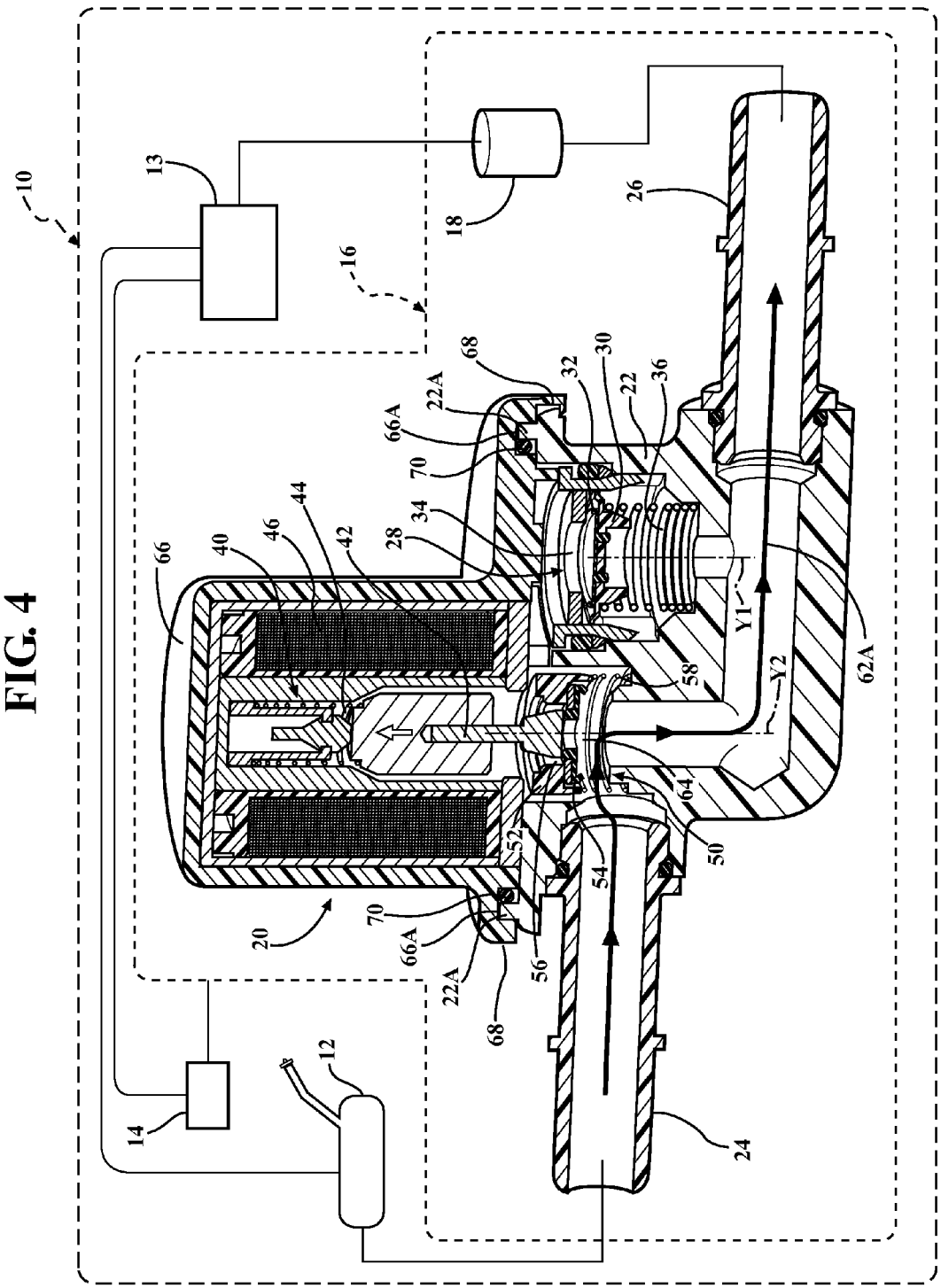
FIG. 4 is a schematic cross-sectional view of the valve assembly shown in FIG. 1, with a third flow path between the fuel tank and the purge canister shown in an open state when the fuel tank is under pressure.
Figure 5:
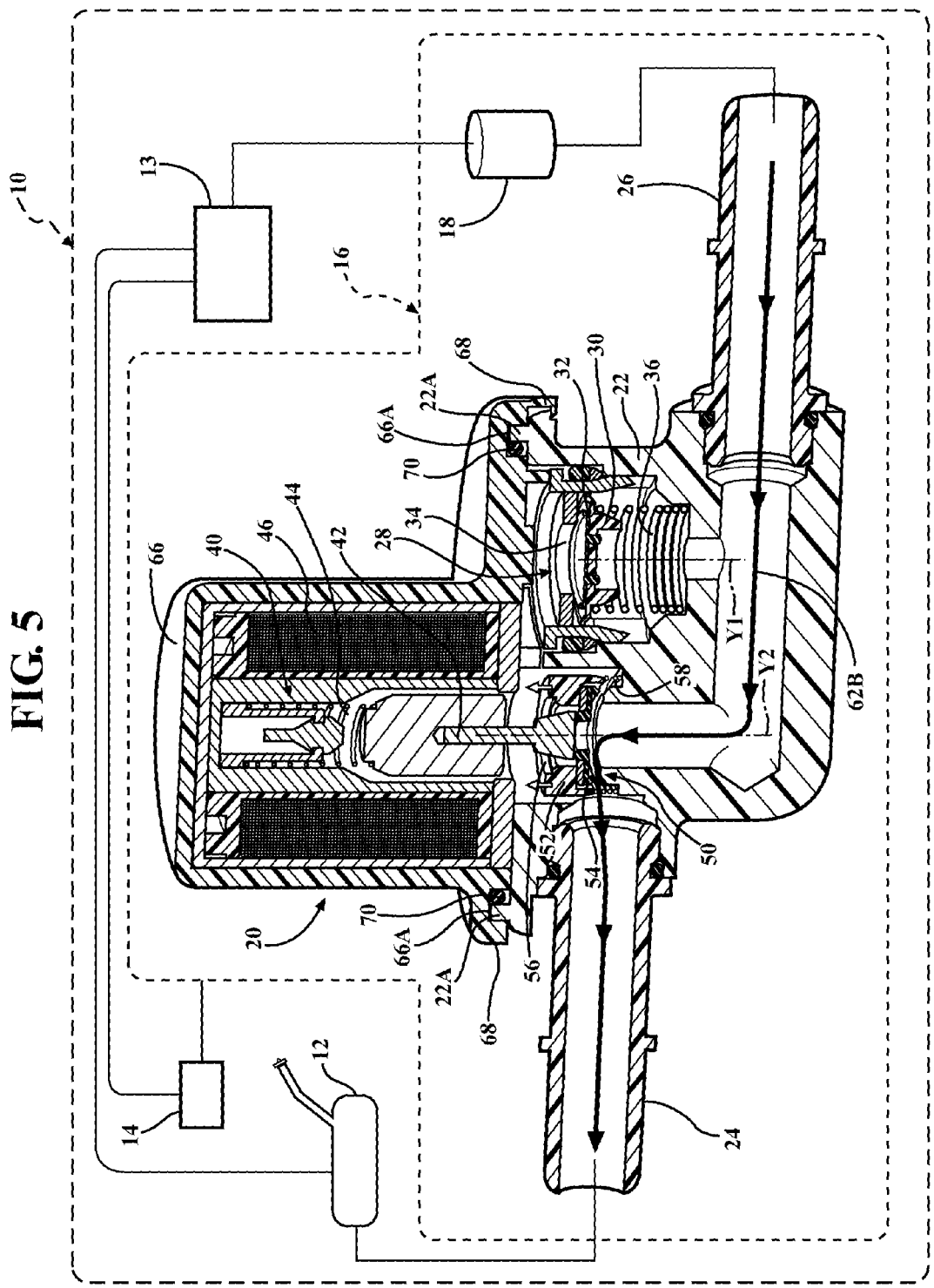
FIG. 5 is a schematic cross-sectional view of the valve assembly shown in FIG. 1, with a third flow path between the fuel tank and the purge canister shown in an open state when the fuel tank is under vacuum.

Piston 52 and seal 54 are urged to close passage 56 by a spring 58. Flow restrictor 50 is configured to open a third fuel vapor flow path represented by arrow 62A, as shown in FIG. 4, and arrow 62B, as shown in FIG. 5. Arrow 62A represents the third fuel vapor flow path being traversed by the fuel vapor flowing in the direction from the fuel tank 12 toward the purge canister 18, and arrow 62B represents the third fuel vapor flow path being traversed by the fuel vapor flowing in a direction from the purge canister 18 toward the fuel tank 12. Fuel vapor flows in the direction represented by arrow 62B when the rate of the fluid flow from fuel tank 12 to purge canister 18 is below the first predetermined reference value.

Figure 6:
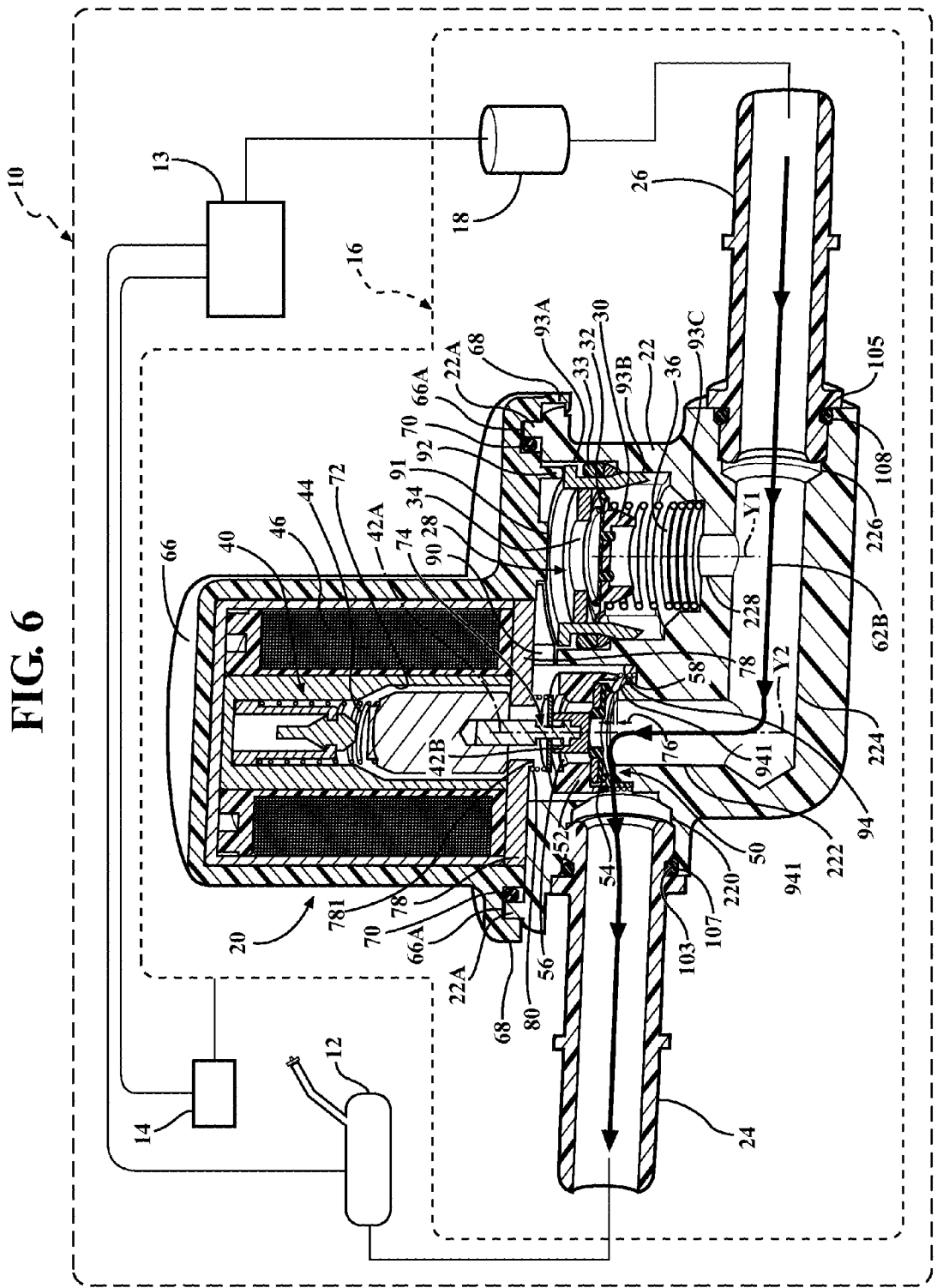
FIG. 6 is a schematic cross-sectional view of the valve assembly having an armature that includes a separate piston and plunger, and the plunger is connected to the piston via a catch mechanism.

As shown in FIG. 6, armature 42 may also be composed of separate parts, a piston 42A and a plunger 42B in order to reduce operational hysteresis of the armature during the opening and closing of the passage 56. Friction may develop between the armature 42 and a bore 72 of the solenoid assembly 40 during the operation of the valve assembly 20. Particularly, such friction may impact the opening and closing instance of the third fuel vapor flow path represented by arrow 62B shown in FIG. 5 as the flow restrictor 50 is pushed out of the way by the vapor flow. In order to address such a possibility, as shown in FIG. 6, the plunger 42B is connected to the piston 42A via a catch mechanism 74. Accordingly, the catch mechanism 74 is configured to maintain the connection between the plunger 42B and the piston 42A.

The catch mechanism 74 is configured to permit the plunger 42B to move or translate away from the flow restrictor 50 for a distance 76 that is sufficient to open the third fuel vapor flow path 62B without the need for the piston 42A to also be displaced away from the flow restrictor. Therefore, the separate piston 42A and plunger 42B permit friction between the piston 42A and the bore 72 to not impact the initial opening of the third fuel vapor flow path 62B. A stop plate 78 is provided to limit travel of the piston 42A within the bore 72.

As shown in the embodiment of FIG. 6, a plunger spring 80 is additionally provided to preload the plunger 42B against the stop plate 78. The plunger spring 80 is configured to press plunger 42B against seal 54 and maintain the normally closed position of the flow restrictor 50 when solenoid assembly 40 is not energized. The plunger spring 80 permits the force of gravity to be employed in pulling the piston 42A against the stop plate 78 when the valve assembly 20 is oriented as shown in FIG. 106. Accordingly, in the situation when the valve assembly 20 is oriented to employ the force of gravity in such manner, the solenoid spring 44 becomes optional. In such a case, the plunger spring 80 is additionally configured to perform all the described functions of the solenoid spring 44.

As shown in FIG. 4, passage 64 is exposed when armature 42 is withdrawn into solenoid assembly 40 in response to the solenoid assembly being energized by the control signal from controller 14. The force of the flow of fuel vapor in the third fuel vapor flow path 62A is insufficient to compress spring 58. Spring 58 is thus permitted to extend and urge the flow restrictor 50 to close passage 56 while at the same time exposing passage 64. In this example, the third fuel vapor flow path represented by arrow 62A is opened when the rate of fluid flow is lower than the predetermined reference value of approximately 260 LPM, but may also be established in relation to a higher or a lower reference value. However, to expose passage 64, the rate of fluid flow in the third fuel vapor flow path should be incapable of compressing spring 58; therefore, the rate of spring 58 should be selected accordingly.

As noted above, flow restrictor 50 is additionally configured to open the third fuel vapor flow path being traversed by the fuel vapor flowing in the direction represented by arrow 62B when the fuel tank 12 is below a second predetermined pressure value (shown in FIG. 5). The first predetermined pressure value is greater than the second predetermined pressure value. While the first predetermined pressure value is preferably a positive number, representing an extreme or over-pressure condition of fuel tank 12, the second predetermined pressure value is preferably a negative number i.e., signifying that the fuel tank 12 is under a vacuum. This vacuum in the fuel tank 12 is sufficient to overcome the force of spring 44, and thereby expose passage 64 to open the third fuel vapor flow path. Spring 44 is specifically designed to permit opening of the third fuel vapor flow path at a specific vacuum set point of the fuel tank 12. As such, the rate of solenoid spring 44 generates a force that is sufficient to close passage 64 when the fuel tank 12 is at positive pressure, but is insufficient to close the same passage when the fuel tank is under vacuum.

In the embodiments shown in FIGS. 1 through 6, valve assembly 20 also includes a cover 66, which in this example is configured as a single-piece component. Cover 66 locates relative to the housing 22 with the aid of a flange 22A nesting inside a channel 66A. Cover 66 engages and interconnects with housing 22 via tabbed extensions 68 that are configured to provide a snap-fit with a lip 97 against the housing. Valve assembly 20 additionally includes a static seal 70 in a gland 96 adapted to hermetically seal cover 66 against housing 22. The channel 66A can include the gland 96. As shown in FIGS. 1-6, and as understood by those skilled in the art, seal 70 is of an O-ring type.

Because the housing 22 provides drop-in assembly for relief valve 28 and flow restrictor 50, the housing 22 can couple with the cover 66 in a "clam shell" fashion. A single leak path is formed between the cover 66 and housing 22, eliminating leak paths that would otherwise be formed when joining the valves. So, instead of a seal between each of the relief valve 28 and the cover 66, and the flow restrictor 50 and the cover 28, a single seal 70 surrounds both the flow restrictor 50 and the relief valve 28 to seal against the housing 22. By locating the relief passage 90 in between the relief valve 28 and the flow restrictor 50 in the housing 22, no seal is needed to corral fluid flow with respect to the cover 66, and, the o-ring 70 does not impede fluid flow in the relief passage between the first recess and the second recess. The housing 22 thus comprises a perimeter edge along 22A, wherein the first recess and the second recess are circumferentially inward of the perimeter edge, and wherein the o-ring seals against the perimeter edge to close the single leak path. The cover receives the solenoid in a drop-in fashion, and the cover and housing halves come together to encapsulate the solenoid against the flow restrictor 50 in a cost-effective manner with few leak paths.

While the best modes for carrying out the invention have been described in detail, those familiar with the art to which this invention relates will recognize various alternative designs and embodiments for practicing the invention within the scope of the appended claims.

The invention claimed is:

1. An angle flow valve comprising:
a housing, the housing comprising:
a first recess for receiving a flow restrictor;
a second recess for receiving a relief valve;
a first port fluidly connected to the first recess;
an angled flow path fluidly connected to the first recess and to the second recess;
a second port fluidly connected to the angled flow path;
a relief passage between the first recess and the second recess; and
a cover comprising a solenoid assembly and a stop plate press-fit to retain the solenoid assembly in the cover,
wherein the first recess is parallel to the second recess,
wherein the first recess is cylindrical, wherein the second recess is cylindrical, and wherein the first recess is parallel in the housing with the second recess having a shared material in-between and form a step in the shared material to form the relief passage, and
wherein the cover couples to the housing by adjoining the solenoid against the flow restrictor and by adjoining the cover against the relief valve.

2. The angle flow valve of claim 1, wherein fluid flow is selectable between two flow paths:
a first flow path of the two flow paths is bidirectionally from the first port, through the first recess, through the angled flow path to the second port; and
a second flow path of the two flow paths is from the first port, through the first recess, through the relief passage, through the second recess, through the angled flow path to the second port.

3. The angle flow valve of claim 2, further comprising the flow restrictor, the flow restrictor comprising a first movable piston comprising a first seal with a first passage.

4. The angle flow valve of claim 3, wherein the first recess comprises at least an angled edge to selectively abut the first seal of the flow restrictor.

5. The angle flow valve of claim 4, wherein the flow restrictor is selectively movable among three positions:
a first position of the three positions blocks the first flow path while abutting the first seal against the angled edge;
a second position of the three positions enables fluid flow at a first rate while abutting the first seal against the angled edge; and
a third position of the three positions enables fluid flow at a second rate by moving the first seal away from the angled edge.

6. The angle flow valve of claim 3, wherein the first recess comprises at least a step to orient the flow restrictor.

7. The angle flow valve of claim 2, further comprising the relief valve, wherein the relief valve comprises:
a second movable piston comprising a second seal; and
a cartridge comprising a second passage,
wherein the relief valve is movable between a blocking position that blocks the second flow path and an opening position that opens the second flow path.

8. The angle flow valve of claim 7, further comprising at least one step in the second recess for orienting the relief valve.

9. The angle flow valve of claim 1, wherein the housing receives the flow restrictor and the relief valve by a drop-in assembly.

10. The angle flow valve of claim of claim 1, wherein the cover comprises at least one step for abutting the relief valve to orient the relief valve with respect to the relief passage.

11. The angle flow valve of claim of claim 1, wherein the stop plate comprises at least one step to orient the flow restrictor.

12. The angle flow valve of claim of claim 1, wherein the cover further comprises at least one tabbed extension, wherein the housing further comprises at least one lip for connecting to the tabbed extension, and wherein the at least one tabbed extension snap-fits to the at least one lip to align the solenoid assembly with the flow restrictor.

13. The angle flow valve of claim 1, wherein the cover further comprises a gland and an o-ring in the gland.

14. The angle flow valve of claim 13, wherein the o-ring surrounds the solenoid assembly, and wherein the o-ring seals the cover to the housing.

15. The angle flow valve of claim 14, wherein the housing comprises a perimeter edge, wherein the first recess and the second recess are circumferentially inward of the perimeter edge, and wherein the o-ring seals against the perimeter edge.

16. The angle flow valve of claim 13, wherein the o-ring does not impede fluid flow through the relief passage.

17. The angle flow valve of claim 1, wherein the first recess is along a first central axis and the second recess is along a second central axis parallel to the first central axis, wherein the first recess fluidly communicates with a first path perpendicular to the first central axis and fluidly communicates with a second path parallel to the first central axis, wherein the second path fluidly communicates with a third path perpendicular to the second path to form the angled flow path, wherein the third path is parallel to a fourth path, wherein the second recess fluidly communicates with the third path via a fifth path perpendicular to the third path, wherein the fifth path is parallel to the second central axis, and wherein the relief passage is parallel to the third path.

18. The angle flow valve of claim 17, wherein the third path is embedded in the housing beneath the relief valve and the flow restrictor so that the housing receives the relief valve and flow restrictor via a drop-in assembly method.

* * * * *